United States Patent [19]

Schürfeld

[11] Patent Number: 4,655,655
[45] Date of Patent: Apr. 7, 1987

[54] TOOL AND WORKPIECE HOLDING ARRANGEMENT FOR MATERIAL REMOVING MACHINING

[75] Inventor: Horst Schürfeld, Bielefeld, Fed. Rep. of Germany

[73] Assignee: Gildemeister DeVlieg System Werkzeuge GmbH, Bielefeld, Fed. Rep. of Germany

[21] Appl. No.: 775,180

[22] Filed: Sep. 12, 1985

[30] Foreign Application Priority Data

Sep. 25, 1984 [DE] Fed. Rep. of Germany ....... 3435119

[51] Int. Cl.⁴ .............................................. B23C 1/00
[52] U.S. Cl. ............................... 409/232; 408/239 A; 464/157; 403/380
[58] Field of Search ............... 409/232, 233; 192/108; 403/380, 364; 408/139, 140, 141, 239; 464/149, 157; 82/40 R

[56] References Cited

U.S. PATENT DOCUMENTS

| | | | |
|---|---|---|---|
| 594,109 | 11/1897 | Weed | 403/380 X |
| 2,011,822 | 8/1935 | Munschauer | 192/108 |
| 2,893,274 | 7/1959 | Mueller | 408/239 X |
| 3,202,433 | 8/1965 | Davis | 409/232 X |
| 3,271,848 | 9/1966 | Montandon | 409/232 X |
| 3,311,023 | 3/1967 | Kaiser | 409/232 |
| 3,337,245 | 8/1967 | Prange | 192/108 |
| 3,542,178 | 11/1970 | Ripple | 192/108 |
| 3,851,562 | 12/1974 | Tomita | 409/233 |
| 4,374,753 | 9/1982 | Clausson | 409/233 X |
| 4,563,116 | 1/1986 | Edens | 409/232 |

Primary Examiner—John Sipos
Attorney, Agent, or Firm—Erwin S. Teltscher

[57] ABSTRACT

A tool and workpiece arrangement for material-removing machining includes a primary holder and a replaceable secondary holder which is mounted on the primary holder, and which carries a tool or a workpiece. The primary holder is provided at its end face, which cooperates with the secondary holder, with portions which extend crosswise with respect to one another around an unprofiled central region at mutually displaced sides so as to be parallel at respective mutually opposite sides, and which have respective flanks. The corresponding end face of the replaceable secondary holder is contoured in a corresponding or complementary manner. Due to the cooperation of the juxtaposed flanks of the profiled portions of the primary holder with those of the secondary holder, there is attached a self-centering effect with a highly repeatable degree of accuracy, and with a positive engagement in the direction of three mutually perpendicular axes, so that axial and radial bending forces as well as torques can be transmitted without any oscillations. The primary and secondary holder are clamped to one another by either a manually operable or an automated clamping arrangement.

17 Claims, 12 Drawing Figures

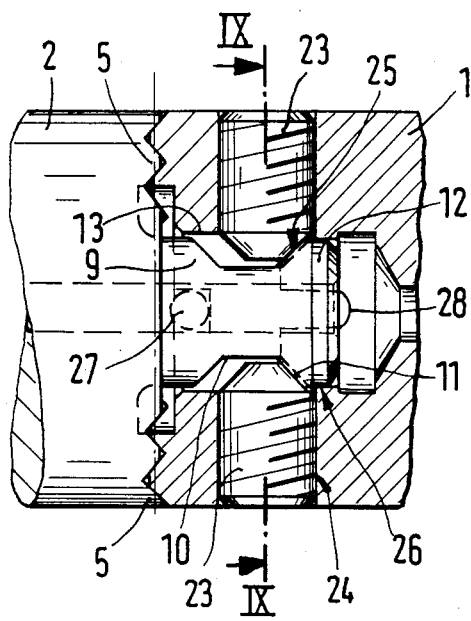
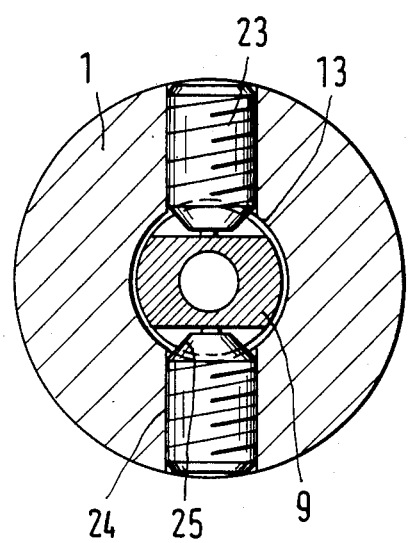
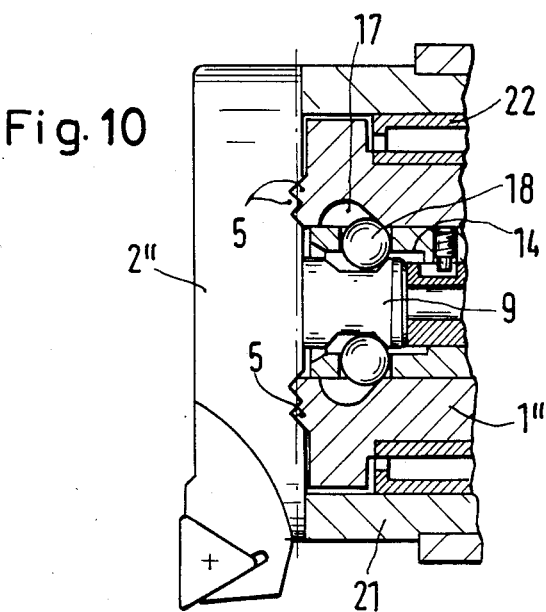

TOOL AND WORKPIECE HOLDING ARRANGEMENT FOR MATERIAL REMOVING MACHINING

BACKGROUND OF THE INVENTION

The present invention relates to holding arrangements for tools or workpieces in general, and more particularly to a tool and workpiece holding arrangement for material-removing machining, which includes a primary holder and a replaceable secondary holder which have respective profiled engagement surfaces by means of which they are form-lockingly connectable with one another with the aid of corresponding clamping mechanisms.

In view of the fact that modern machine tools are designed for the performance of material-removing machining operations which are very different in character, such as drilling, milling and turning, numerous requirements are also placed on the holding arrangements for the various tools, or for the workpieces, as a result of these varied machining tasks, on the one hand, and in view of an automatic performance of the operations with corresponding tool or workpiece exchange, on the other hand.

Besides high flexibility for the accommodation to the respective machining tasks and requirements as well as to the various machine configurations and concepts embodied therein a high stability both in the static sense and in the dynamic sense must be achieved, even when considering the various material-removing operations with fundamentally different loadings. There must be provided a high exchange and repetition accuracy, in order to be able to satisfy narrow manufacturing tolerances, even during automated performance of the various operations. There must further be provided a simple handling capability both for the manual and for the automatic exchange and, despite the complexity of the requirements, the holding arrangement must be capable of being produced in an economical and relatively inexpensive manner.

The heretofore known holding arrangements for the material-removing machining can satisfy only some of these requirements, owing to their respective configurations and structural features. Such holding arrangements are normally designed by the manufacturer for only one predetermined material-removing operation, for example, for a turning operation or for a drilling operation, and for the loadings which result from such predetermined operations. These do not, however, include any profiled surfaces between the primary holder and a replaceable secondary holder, but are rather provided in each instance with one or two mutually engaging projections corresponding to the respective loading case; these are known from the European Patent Application EP-A-001-0074, German published Patent Application DE-A No. 30 07 440 and the German Patent DE-PS No. 31 08 439; additionally, there is already known, from the German Patent Application DE-A No. 32 28 521 a holding arrangement in which the mutually facing surfaces of the replaceable secondary holder and of the primary holder are profiled and positively engage one another after the corresponding actuation of the clamping mechanisms. The profiled portions utilized in this construction are constituted by cooperating teeth, which are configured in the manner of a so-called Hirth tooth arrangement, and where the tooth arrangements are arranged radially with respect to a center that is situated in the middle of the respective engagement surfaces. Owing to this configuration, it is already possible to transmit fundamentally different forces, such as those resulting from the different material-removing measures, especially axial bending forces, radial bending forces, but also turning moments or torques, at the connecting region of the replaceable secondary holder and the primary holder. Moreover, a self-centering effect takes place after the activation of the clamping mechanism, so that there is attained a high accuracy when replacing or exchanging such holders. Due to the self-centering effect, the clamping mechanism itself can be provided with relatively wide tolerances in the region of the cooperating elements, so that the relatively coarse initial approach accuracy, which is obtained during the automatic holder exchange by the automatic gripper equipment is, nevertheless, sufficient. On the other hand, the adaptability of the holding arrangement of this construction to the respective machining requirements and machine concepts is nevertheless relatively low and, in particular, the manufacturing costs of such tooth-engagement arrangements are relatively high, resulting from the requirement for producing the teeth one-by-one, and always in a slightly different orientation with respect to the center. Extremely narrow limits are imposed on the construction of the enlargement and any supplements of the engagement surfaces beyond, so to say, the basic scheme of the engagement surface, which is often needed for certain types of manufacturing operations. Such supplemental- or enlargement-surfaces are often desired for the performance of certain manufacturing operations. They are to be arranged at predetermined locations for the secure support of the tool or of the workpiece, and are to be provided with respective tooth-engagement arrangements or toothed-engagement sections. However, an economical producibility of the latter can only be realized, when these further toothed-engagement sections are arranged in alignment with the tooth-engagements of the basic engagement surface so that, in this construction, as a result of the central orientation of the toothed arrangements of the basic engagement surface, there are hardly obtained any meaningful arrangements and/or configurations and, basically, any enlargement or supplements suitable for adaptation to the various material-removing operations are absent from this particular construction.

SUMMARY OF THE INVENTION

Accordingly, it is a general object of the present invention to avoid the disadvantages of the prior art.

More particularly, it is an object of the present invention to provide a holding arrangement for a tool or a work-piece during any material-removing machining operation, which obviates the disadvantages of known arrangements of this type.

Still another object of the present invention is to so construct the arrangement of the type here under consideration as to satisfy the various requirements with respect to the various loading forces and torques operatively acting thereon, as well as to satisfy the requirements for the spatial and geometrical compatibility of the holding arrangement with respect to the engagement surfaces.

It is yet another object of the present invention to so design the arrangement of the above type as to be relatively simple in construction, inexpensive to manufacture, easy to install and use, and nevertheless reliable in operation.

A concomitant object of the present invention is to develop an arrangement of the above type which is particularly suited for automation of the holder-replacement operation.

In pursuance of these objects and others which will become apparent hereinafter, one feature of the present invention resides in a holding arrangement for holding one of a tool and workpiece during a material-removing machining operation, which comprises a primary holder having a first engagement surface; a replaceable secondary holder having a second engagement surface which faces the first engagement surface in an assembled position of the secondary holder with the primary holder; cooperating force-transmitting means on the first and second engagement surfaces for transmitting forces between the primary and secondary holders, including elongated profiled portions provided in a spatially crossing fashion on the first and second engagement surfaces around an unprofiled central region thereof at mutually angularly displaced sides of the latter, the profiled portions having respective flanks which are juxtaposed with one another and engage each other in the assembled position; and means for clamping the primary and secondary holders with one another in the assembled position. In this respect, it is particularly advantageous when the afore-mentioned sides are arranged in pairs across the central region, and when the profiled portions on the sides of each of the pairs extend parallel to one another. A particular advantage of the construction as described so far is that the spatially crossing arrangement of the profiled portions provides regions at the engagement surfaces which produce a very reliable self-centering effect, so that there is attained, in the final analysis, a positive connection in three different mutually perpendicular axial directions, with reliable acceptance of both axial and radial bending forces, as well as of turning moments or torques, together with a very high accuracy of replacement and repeatability. Herein, the use of the flank-carrying profiled portions assures that a secure positive engagement occurs at the respective profiled portion flanks during the clamping, which positive engagement assures a very high stability in the static as well as in the dynamic behavior and, in contrast to two surfaces abutting one another along a plane, has a very high capability to damp oscillations, so that, for all intents and purposes, oscillations cannot occur. The so attained high static loadability is here especially suited for the transmission of high torques.

What is particularly to be stressed in this context is the attainment of a simple and economical manufacture of these crosswise arranged profiled sections. They can, for instance, be manufactured only after the heat treatment of the material, in a shaping operation using exclusively a grinding process, that is, in an extremely economical manufacturing procedure, which, additionally, assures a high precision of its shape, and, in connection wih a high resistance to wear, and a low contamination danger, results in turn in a long useful life with a non-changing replacement accuracy.

It is further to be emphasized that there is obtained an extreme flexibility with respect to the geometric and spatial adaptability of the replaceable secondary holder and the primary holder to the various material-removing tasks. So, for instance, it is possible to provide, especially for corresponding purposes, enlargements and extensions of the basic engagement surfaces, with the provision of the corresponding profiled portions on the enlargement surfaces, without encountering any problems. Thus, for all intents and purposes, there exist along any spatial direction, and without any appreciable increase in the manufacturing costs, possibilities to attach further profiled portions or sections practically along all spatial directions of any contemplated enlargement, such that the additional profiled portions or sections are in alignment with the available profiled portions of the basic engagement surface. In this manner, there are obtained for the various material-removing machining cases additional tool or workpiece supports exactly where they are needed as considered with respect to the application of the loading forces.

What is also to be emphasized is the very simple handling capability, especially in connection with an automatic tool replacement. The self-centering effect renders possible coarse tolerances in the region of the cooperating elements of the clamping mechanism, so that an only very coarse accuracy of presentation of the replaceable secondary holder with respect to the primary holder is sufficient to accomplish holder replacement and clamping actuation of an exact and reliable nature.

Further advantageous features of the invention will become apparent as the description proceeds. Such additional features are characterized by advantageous constructive and geometric configurations of the profiled sections or portions thereof, and of the enlargement surfaces, which contribute to the above-mentioned advantages of the present invention. In this connection, it is to be highlighted that certain of the features reside in the particular construction of the clamping arrangement for the two holders, which clamping arrangement cooperates with, and is in a special relationship to the engagement surfaces and their profiled portions, which renders it possible to a particular extent to achieve a reliable automatic handling, but has such a basic construction that it renders possible a manual clamping which is unproblematical and correct, as far as the handling is concerned.

BRIEF DESCRIPTION OF THE DRAWING

Examples of the embodiment of the tool and workpiece arrangement according to the present invention will be discussed in more detail in the following with reference to the accompanying drawing, in which:

FIG. 8 is a view similar to FIG. 6, but with a clamping mechanism designed for manual actuation, in the clamping position;

FIG. 9 is a cross-sectional view taken on line IX—IX of FIG. 8; and

FIGS. 10–12 are views similar to FIG. 1, but showing further modifications of the construction of the holding and clamping arrangements.

DETAILED DESCRIPTION OF THE PREFERRED EMBODIMENTS

Figure 2:
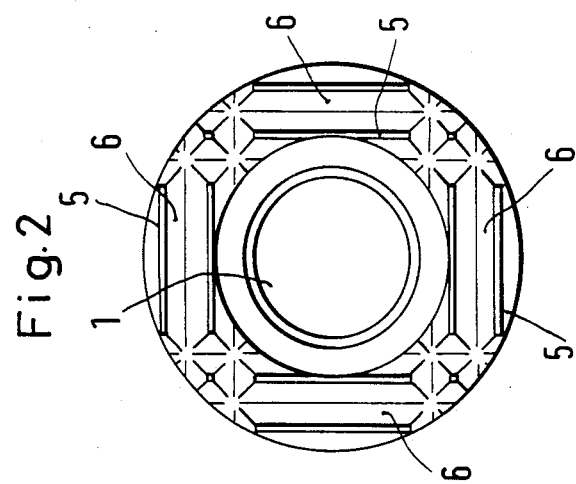
FIG. 2 is an end view of an engagement surface of a primary holder of the arrangement of FIG. 1.
Figure 1:
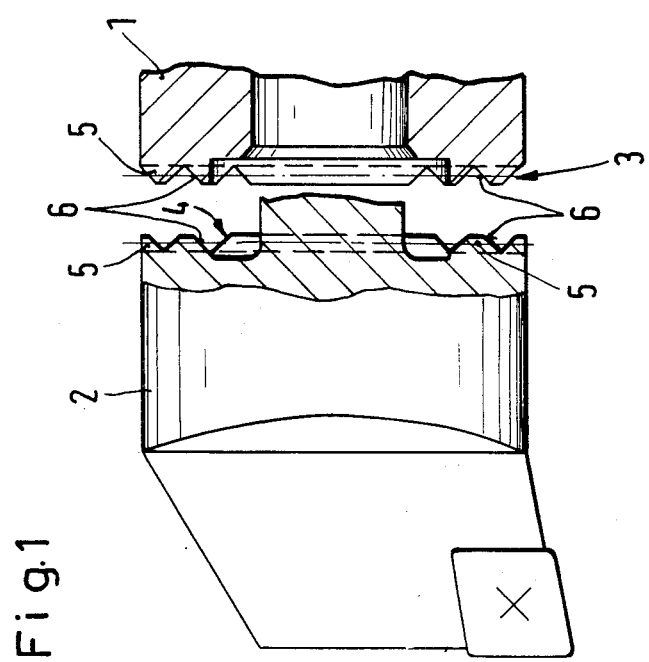
FIG. 1 is a partial, partially sectioned, side elevational view of a tool holding arrangement according to the present invention.

Referring now to the drawing in detail, and first to FIGS. 1 and 2 thereof, it may be seen that the reference numeral 1 has been used therein to identify a primary or base holder of a tool holding arrangement of the present invention, which further includes a replaceable secondary or auxiliary holder 2 which, in this instance, carries a tool, for instance, a turning bit or cutting element. The primary holder 1, on the one hand, and the secondary holder 2, on the other hand, are provided, at their respective end faces, with engagement surfaces 3 and 4 respectively, which include a plurality of profiled portions 5 which cooperate with one another as between the engagement surfaces 3 and 4. As may be seen especially in FIG. 4 of the depicted construction, the profiled portions 5 are arranged respectively around the centers of the engagement surfaces 3 and 4 at four sides of the engagement surfaces 3 and 4, the profiled portions 5 being arranged at respective angles with respect to one another, such angles amounting to 90° in the illustrated construction. The profiled portions 5 are so configured that respective flanks 6 thereof bear against each other as between the profiled portions 5 of the engagement surfaces 3 and 4 when such engagement surfaces 3 and 4 are engaged with, and clamped to one another. In the illustrated construction, the profiled portions 5 have prismatic configurations or cross-sections, their respective oppositely facing flanks 6 each subtending preferably acute angles with one another, and wherein each acute angle is equal to, or smaller than 90°. Such prismatic profiled portions 5 can be particularly easily manufactured, after an initial heat treatment of the material, by resorting to a shaping process which is exclusively performed by grinding.

Once the profiled portions 5 of the engagement surfaces 3 and 4 are properly engaged with one another and then clamped to one another, there is obtained, at the flanks 6 of the profiled portions 5, a positive, force-transmitting connection. As can be seen from FIGS. 1 and 2, considered in conjunction with one another, the ratio of the flank-to-flank engagement surfaces 3 and 4 of respective of the holders 1 and 2 in contact with one another, to surfaces free of any contact of the holder 1 with the corresponding surfaces of the holder 2 (the truncated vertically extending surfaces between the flank surfaces, as seen in FIG. 1) is about 85%. The cross-wise arrangement of the profiled portions 5 on the respective engagement surfaces 3 and 4 assures, in this instance, that a self-centering effect is produced in each instance at the engagement surfaces 3 and 4; this self-centering effect ensures ease of replacement, and a high degree of repetitive replacement accuracy. Here, the resultant positive force-transmitting connection is effective in three mutually perpendicular axes, so that it can transmit, without any oscillations, axial as well as radial bending forces and torques.

Figure 3:
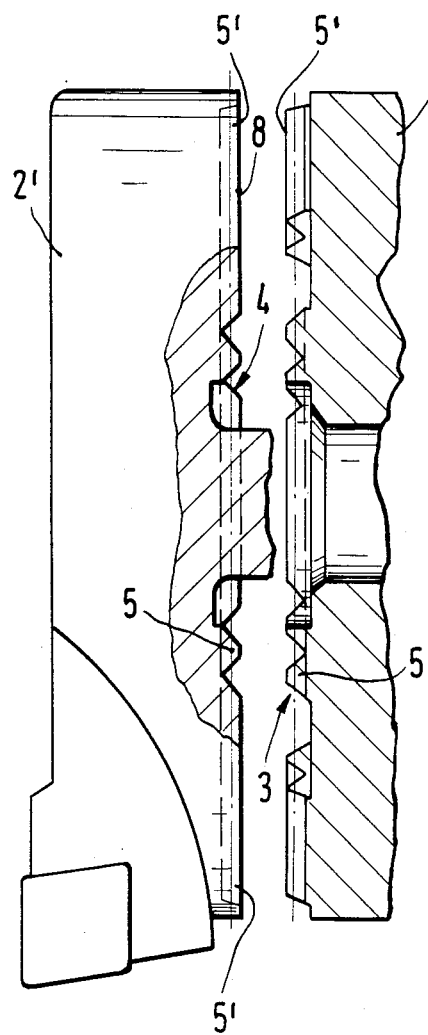
FIG. 3 is a view corresponding to FIG. 1, but of a modified construction of the arrangement of the present invention.
Figure 4:
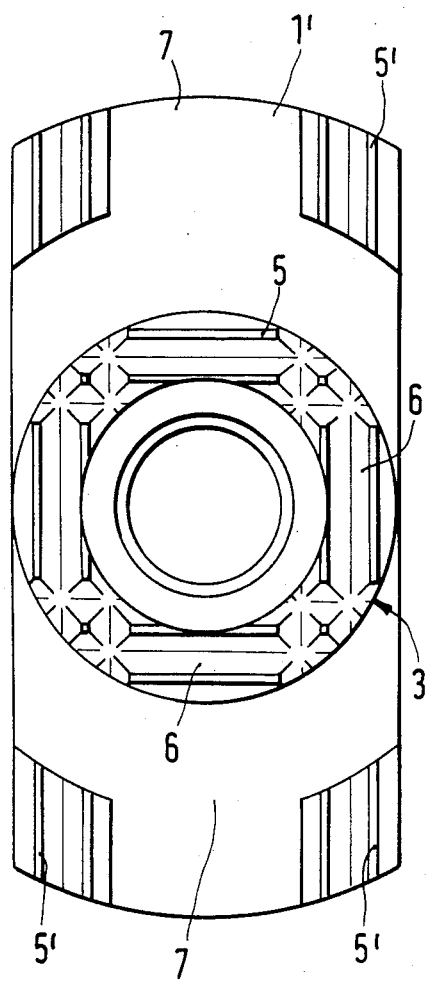
FIG. 4 is a view similar to FIG. 1, but of the arrangement depicted in FIG. 3.

In the construction that is illustrated in FIGS. 3 and 4 of the drawing, it is shown how, in a very simple manner, commencing, for instance, with the basic principle of the holding arrangement as depicted in FIGS. 1 and 2, and by a flexible adaptation to a different machining case, the connective linkage of the primary holder with the replaceable secondary holder can be broadened, while maintaining a very simple manufacturing process. Thus, FIGS. 3 and 4 illustrate a base or primary holder 1' and a replaceable auxiliary or secondary holder 2' which, in addition to having the basic engagement surfaces 3 and 4 provided with the crosswise arranged profiled portions 5, are also formed, at two mutually opposite sides, with enlargement surfaces 7 and 8. The enlargement surfaces 7 and 8 each include, in the illustrated construction at their respective spatial corners, further profiled portions or sections 5' which are respectively disposed in an aligned relationship with the respective profiled portions 5 situated in the base engagement surfaces 3 and 4. Consequently, in this illustrated construction according to the present invention, the replaceable secondary holder 2' again achieves in a very advantageous manner a reliable, positive support immediately underneath the turning or cutting edge which, in this instance, is situated relatively far away from the center of the holding arrangement.

A consideration of FIGS. 3 and 4 will reveal that, basically, when using this system, the engagement surfaces 3 and 4 can be arbitrarily varied as to their shape and size, and thus be adapted to the specific requirements and tasks. Furthermore, there also result, in each instance, optional arrangements for further engagement portions or sections, preferably in aligned positions with respect to the profiled portions 5 of the base engagement surfaces 3 and 4.

Figure 5:
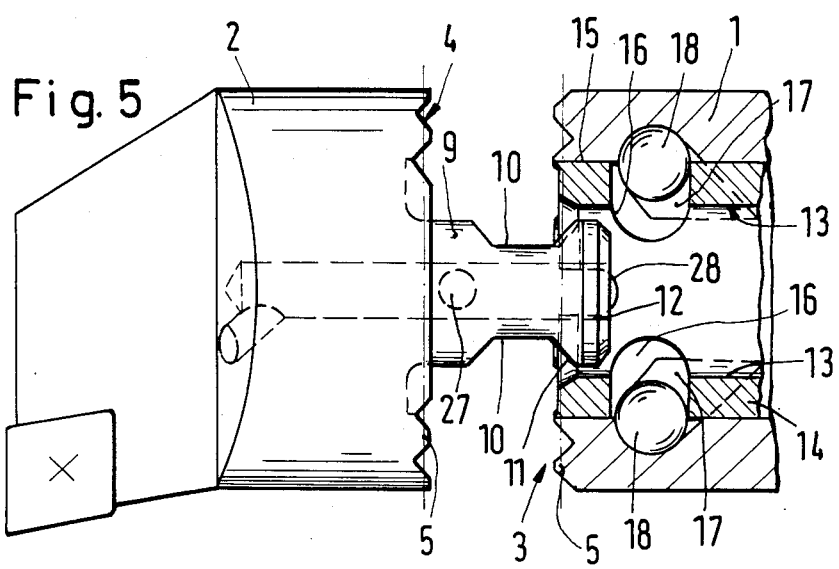
FIG. 5 is a view similar to FIG. 1 and further showing a clamping mechanism for automatic replacement in the open position of the clamping mechanism.
Figure 6:
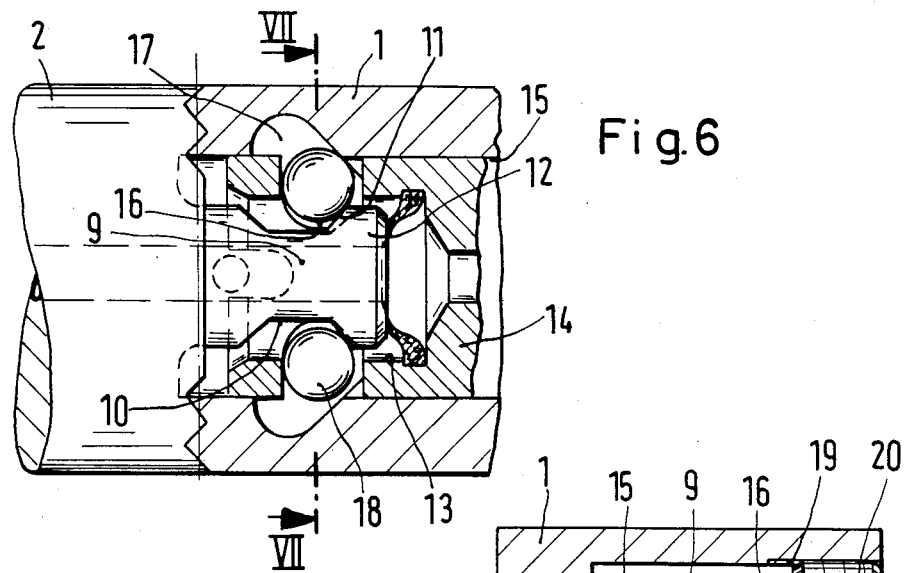
FIG. 6 is a view corresponding to FIG. 5, but in the clamped position of the clamping mechanism.
Figure 7:
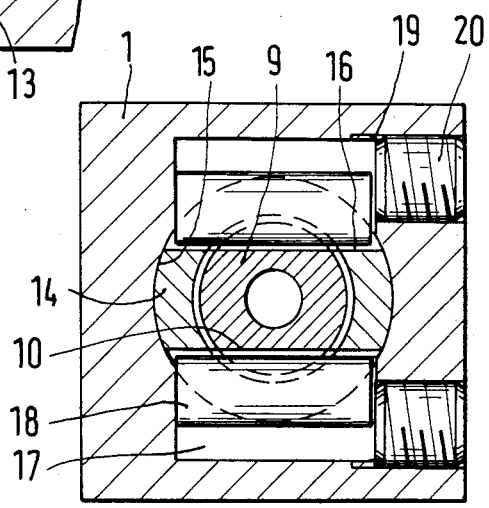
FIG. 7 is a cross-sectional view taken on line VII—VII of FIG. 6.

Turning now to FIGS. 5, 6 and 7 of the drawing, it may be seen that they depict a construction of a holding arrangement with a base or primary holder 1 and a replacable auxiliary or secondary holder 2 corresponding to those illustrated in FIGS. 1 and 2, in conjunction with a clamping mechanism which is specifically designed with the view toward an automated replacement. This holding arrangement is matched, as far as its flexibility and its force transfer capability is concerned, to the high flexibility and the high force transfer capability of the holding arrangement as such. In the illustrated construction, there is provided a tension rod 9 at the center of the secondary holder 2, which projects at an angle of 90° with respect to the engagement surface 4, and beyond the profiled portions 5 of the engagement surface 4. In the depicted construction, the tension rod 9 includes two mutually opposite lateral cutouts or depressions 10, next to which, as considered in the direction toward the free end of the tension rod 9, there is arranged a clamping surface 11 provided at the rear side of a head 12 and preferably extending at an inclination of 45° with respect to the axis of the tension rod 9.

A receiving bore or recess 13 is provided in the primary holder 1. This recess 13 is also arranged centrally with respect to the associated engagement surface 3, which is provided with the profiled portions 5, and which has a relatively large leeway with respect to the tension rod 9.

In this construction, the receiving recess 13 is constituted by the free inner space of a clamping tube 14 which, in turn, is arranged in a bore 15 of the primary holder 1 and forms a common clamping axis with the tension rod 9 of the replaceable secondary holder 2. A plurality of, for instance two mutually oppositely arranged, recesses 16 are respectively provided in the clamping tube 14 at the front head region adjacent to the engagement surface 3, which recesses 16 may also be referred to as clamping slots. Furthermore, a plurality of, preferably also two mutually opposite, pocket-shaped recesses 17 are provided in the cylindrical bore 15 of the primary holder 1, extending at an angle with respect to the afore-mentioned clamping axis and being situated at a corresponding region of the bore 15; these recesses 17 may be referred to as clamping pockets 17 in the primary holder 1, and are so configured as to be able to receive cylindrical clamping rollers 18. The clamping rollers 18 can be introduced into the clamping pockets 17 and the clamping slots 16 through cylindrical bores 19, which are provided in the primary holder 1 in alignment with the respective ends of the corresponding clamping pockets 17, and which can again be closed by threaded slugs 20. During a translatory motion of the clamping tube 14, the clamping rollers 18 move in the clamping pockets 17, depending on the direction of the translatory movement, either toward the center of the clamping tube 14 and thus toward the clamping axis, or away from the center of the clamping tube 14 and thus away from the clamping axis.

In this construction, the clamping and clamping release during a replacement operation takes place as follows:

For clamping, the tension rod 9 of the replaceable secondary holder 2 is introduced into the receiving bore 13 of the clamping tube 14 which is then situated in its forward position in the primary holder 1, until the engagement surfaces 3 and 4 come approximately or substantially into contact with one another. As a result of pulling the clamping tube 14 in the primary holder 1, the clamping rollers 18 are moved toward the center of the clamping tube 14, and there result, in each instance, three linear contact zones, respectively, between each clamping roller 18, a wall of the corresponding clamping pocket 17, a wall of the corresponding clamping slot 16 of the clamping tube 14, and the clamping surface 11 of the tension rod 9, which contact zones constitute a positive connection of the parts of the clamping mechanism that may withstand high stress for any conceivably occurring loading. The exact centering and positioning of the replaceable secondary holder 2 and the primary holder 1 with respect to one another herein occurs during the clamping, as a result of the self-centering effect of the profiled portions 5 of the engagement surfaces 3 and 4.

The clamping release occurs in response to the shifting of the clamping tube 14 in the primary holder 1 in a direction opposite to the clamping direction. In this instance, the clamping rollers 18 are moved outwardly away from the center of the clamping tube 14, as a result of which there is again obtained a free passage for the tension rod 9 of the replaceable secondary holder 2. Then, the replaceable secondary holder 2 can be disassembled from the primary holder 1 without encountering any problems. The shifting and pulling movement of the clamping tube 14 in the primary holder 1 can be achieved without any problems in an automated manner.

Figure 11:
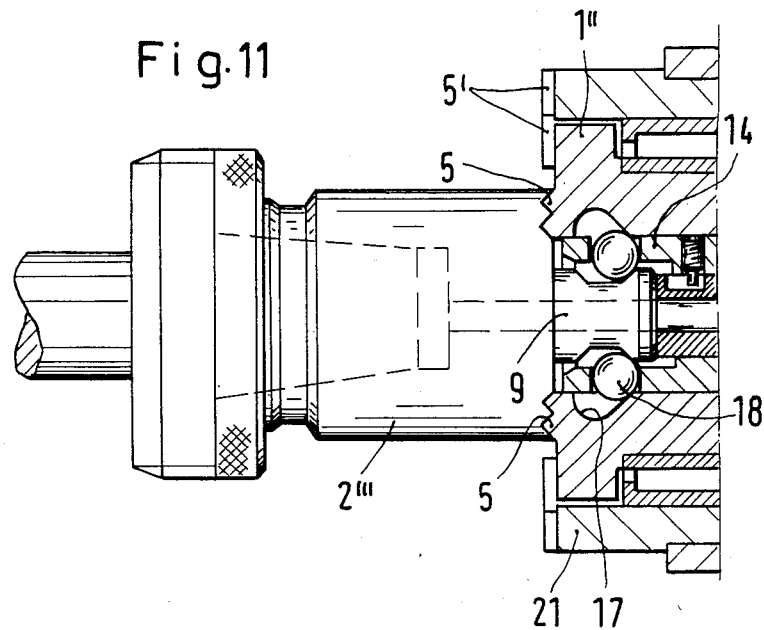

The basic construction of the clamping mechanism, in conjunction with the construction of the engagement surfaces 3 and 4 of the replaceable holder 2 and of the primary holder 1 with the respective crosswise profiled portions 5 further renders possible a replacement of stationary as well as rotating replaceable holders 2, even on the very same primary holder 1, when such a primary holder 1 is correspondingly constructed. This is illustrated in FIGS. 10 and 11 of the drawing. Therein, there is shown a base or primary holder 1" which is received in a stationary sleeve or tube 21, and supported therein by rotational bearings 22 for rotation, and which additionally again includes an engagement surface which is provided with corresponding crosswise profiled portions 5. In addition thereto, the primary holder 1" again has the clamping mechanism which has been described above in connection with FIGS. 5, 6 and 7. The corresponding replaceable secondary holder 2" again has the corresponding crosswise profiled portions 5 at its engagement surface and is provided with the tension rod 9. The secondary holder 2" further includes at its outward regions, where it comes into contact with the sleeve or tube 21, positive engagement elements or portions which, once more, can be constituted by profiled sections comparable to the profiled sections 5' discussed above in connection with FIG. 4, while corresponding profiled sections 5' are provided at the end surface of the sleeve or tube 21, as illustrated, for example, in FIG. 11. When the sleeve or tube 21 is stationary, there is attained an arrangement in which the primary holder 1" is rotatable and the replaceable secondary holder 2" is stationary. When the same construction of the primary holder 1" is used as a basis, as illustrated in FIG. 11, then it has been established that another replaceable secondary holder 2''' can be mounted and clamped here instead of the existing secondary holder 2", which secondary holder 2''' then again includes at its connection region merely the tension rod 9, and the basic engagement surface 4 with the corresponding profiled portions 5. In the construction depicted in FIG. 1, both the primary holder 1" and the secondary holder 2''' rotate.

Figure 12:
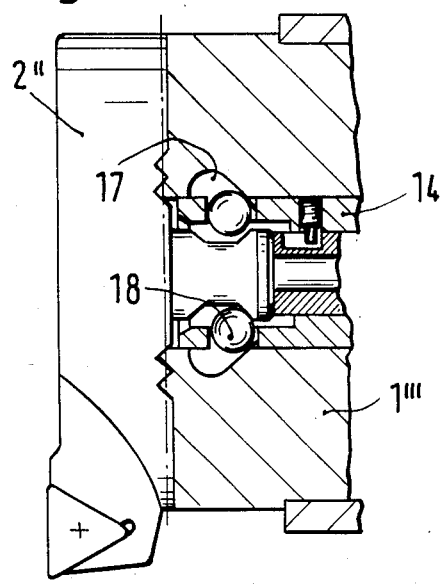

In the construction illustrated in FIG. 12 of the drawing, there is provided a base or primary holder 1''' which is once more equipped with a corresponding clamping mechanism including the clamping tube 14 and the clamping rollers 18. The primary holder 1''' is held stationary. It can be constructed at its entire engagement surface region, inclusive of enlargement surface zones extending beyond the basic engagement surface zones, in a manner comparable to the construction depicted in FIG. 4. On this primary holder 1''', there can be mounted, for instance, a replaceable secondary holder corresponding to the secondary holder 2" according to FIG. 10, but also, without any problem, even a replaceable secondary holder 2''' corresponding to that depicted in FIG. 11. In both instances, there is attained a system having a stationary primary holder and a stationary replaceable secondary holder.

In the construction depicted in FIGS. 8 and 9 of the drawing, there is provided a holding arrangement including a clamping mechanism which is designed for manual holder replacement. Here again, a tension rod 9 is provided which is rigid with the replaceable secondary holder 2, is disposed centrally therein, and extends beyond the profiled portions 5 of its engagement surface 4. Once more, a receiving bore 13 is provided in the primary holder 1, which has a relatively large leeway with respect to the tension rod 9. In this instance, the receiving bore 13 is provided directly in the primary holder material. A plurality of, for instance two oppositely situated, threaded slugs 23 are threadedly engageable and displaceable from the respective side regions all the way up to the receiving bore 13 in corresponding threaded bores 24 of the primary holder 1. The threaded slugs 23 are provided at their leading ends with inclined surfaces 25 which extend at angles corresponding to that of the inclined surfaces 11 of the tension rod 9, so that the clamping and release of the holding arrangement can be achieved by the corresponding threading of the slugs 23 into and out of the receiving bore 13. In order to avoid displacement of the axis of the tension rod 9 away from the axis of the primary holder 1, the head 12 of the tension rod 9 is advantageously configured, at least at a section thereof, cylindrically, and a matching bore section 26 cooperating with this cylindrical head section 12 is provided in the rear area of the receiving bore 13.

In order to avoid any undesired clamping of the replaceable secondary holder 2 with respect to the primary holder 1 which is displaced through 180° with respect to the operating position, there is provided on the tension rod 9 of the replaceable secondary holder 2, as shown in FIGS. 5 and 8, a guard pin 27, while a corresponding guard groove 28 is provided in the primary holder 1 which receives the guard pin 27, so that there is attained a kind of coding having an unambiguously determined clamping position. If the guard pin 27 were then knowingly moved through 180° on the tension rod 9, the latter would be clampable with the primary holder 1 in the correspondingly rotated reverse position.

In the constructional examples described above, it was assumed that a one-piece primary holder 1 is provided. However, the primary holder as such can be constructed in a multi-part manner. In this connection, it is possible and contemplated by the present invention to provide an element set in the form of adapter parts which are constructed and configured especially for the cooperation with the respective different replaceable secondary holders.

Furthermore, in the constructional examples described above, it was always assumed that the holder is a tool holder. It is to be understood, however, that the holder in its entirety can just as well and with the same advantages be constructed as a workpiece holder, especially when the replaceable secondary holder is also construted for the accommodation and engagement of workpieces.

The profiled portions 5 can also have different shapes or cross-sections deviating from the prismatic configurations discussed above, for instance, half-circular or other rounded cross-section, so long as they are provided with respective cooperating flanks.

Deviating from the construction described above, the replaceable secondary holders may also have two or more of the tension rods. Then, a corresponding number of receiving bores would be provided in the primary holder.

Furthermore, only one profiled section per side at each of the engagement surfaces is sufficient for certain applications.

While the invention has been illustrated in a preferred embodiment, it is not to be limited to the arrangement shown, since many variations thereof will be evident to one skilled in the art, and are intended to be encompassed in the present invention as set forth in the following claims.

I claim:

1. A holding arrangement for holding one of a tool and a workpiece during a material-removing machining operation, comprising in combination
   a primary holder having a first engagement surface;
   a replaceable secondary holder having a second engagement surface which faces said first engagement surface in an assembled position of said secondary holder with said primary holder; and
   cooperating force-transmitting means on said first and second engagement surfaces for transmitting fundamentally different respective forces between said primary and secondary holders, said forces including axial bending forces, radial bending forces, and torques, said force-transmitting means including elongated profiled portions provided in a spatially crossing fashion on said first and second engagement surfaces, respectively around, and tangentially to, an unprofiled central region thereof at mutually angularly displaced sides of said unprofiled central region,
   said profiled portions having respective flanks extending tangentially to said central region and which engage one another in said assembled position to transmit said forces, and
   clamping means for clamping said primary and secondary holders to one another in said assembled position and cooperating with said profiled portions, said profiled portions being constructed so as, for all intents and purposes, to be free of any oscillation when cooperating with said clamping means in said assembled position.

2. The arrangement as defined in claim 1, wherein said sides are arranged in pairs across said central region, and said profiled portions on said sides of each of said pairs extend parallel to one another.

3. The arrangement as defined in claim 2, wherein two of said pairs of sides are provided, and said profiled portions of one of said pairs of sides extend at an angle of 90° with respect to those of the other of said pair of sides.

4. The arrangement as defined in claim 1, wherein said profiled portions have prismatic configurations with said flanks thereof including an acute angle of at most 90° with one another.

5. The arrangement as defined in claim 1, wherein only one of said profiled portions is provided at each of said sides.

6. The arrangement as defined in claim 1, wherein said primary and secondary holders further include enlargement surfaces situated radially outwardly from said engagement surfaces; and wherein said cooperating force-transmitting means further includes additional profiled portions arranged at predetermined regions of said enlargement surfaces.

7. The arrangement as defined in claim 1, wherein said additional profiled portions are aligned with respective associated ones of said profiled sections.

8. The arrangement as defined in claim 1, wherein one of said holders is provided with at least one tension rod rigid therewith and extending from the respective engagement surface and beyond said profiled sections, said tension rod having an inclined surface which is oriented in a sense toward pulling said profiled portions together; wherein the other of said holders has at least one receiving recess that opens onto said engagement surface thereof, and has a leeway with respect to said tension rod for receiving the latter in said assembled position; and wherein said clamping means is mounted on said one holder, extends into said receiving bore, and acts on said inclined surface to pull said primary and secondary holders together in said assembled position.

9. The arrangement as defined in claim 1, wherein said one tension rod and said one receiving bore are respectively arranged centrally of said profiled portions of the respective engagement surfaces.

10. The arrangement as defined in claim 8, wherein said clamping means further includes a clamping tube shiftably received in the interior of said other of said holders and bounding said receiving bore; wherein said interior of said other holder has clamping pockets at regions thereof that correspond to those of said clamping slots; wherein said clamping means includes cylindrical clamping rollers which are received in said clamping slots and in said clamping pockets, and further comprising means for moving said clamping rollers toward the center of said clamping tube so as to form three linear contact zones, respectively, between each clamping roller, a wall of the corresponding clamping pocket, a wall of the corresponding clamping slot, and a clamping surface of said tension rod, upon pulling said clamping tube in said primary holder, said linear contact zones constituting a positive connection that may withstand high stress for any conceivably occurring loading.

11. The arrangement as defined in claim 1, wherein said clamping pockets have respective ends; wherein said other holder has threaded bores aligned with said ends of said clamping pockets for the introduction of said clamping rollers therethrough into said clamping pockets and clamping slots; and further comprising threaded closing slugs removably received in said threaded bores for closing the same.

12. The arrangement as defined in claim 8, wherein said other holder has at least two threaded bores which are arranged oppositely to one another across said receiving bore; and wherein said clamping means includes at least two clamping slugs which are threadedly received in said threaded bores and have respective clamping surfaces at respective leading ends thereof, which cooperate with said inclined surface of said tension rod of said one holder to pull said primary and secondary holders together in said assembled position.

13. The arrangement as defined in claim 1, wherein said tension rod includes a cylindrical head portion at a free end thereof, which is remote from said engagement surface of said one holder; and wherein said receiving bore of said other holder has a receiving bore section behind said threaded bores as considered in the direction of introduction of said tension rod into said receiving bore, said receiving bore section being dimensioned to receive said cylindrical head portion of said tension rod substantially without any clearance.

14. The arrangement as defined in claim 8, wherein said tension rod of said one holder has a guard pin, and said other holder has a guard groove which receives said guard pin only in one angular position of said one holder with respect to said other holder.

15. The arrangement as defined in claim 1, wherein said secondary holder further includes enlargement surfaces situated radially outwardly from said second engagement surface and having additional profiled sections, and further comprising a stationary sleeve having auxiliary profiled sections corresponding to said additional profiled sections and engaged therewith in said assembled position to arrest said secondary holder against rotation with respect to said sleeve, and wherein said primary holder is rotatably mounted in said sleeve.

16. The arrangement as defined in claim 1, wherein said profiled portions of said cooperating force-transmitting means include flank-to-flank engagement surfaces of respective holders in contact with one another, but exclude surfaces of one holder free of any contact with the corresponding surfaces of the other holder.

17. The arrangement as defined in claim 16, wherein the ratio of the flank-to-flank engagement surfaces of respective of said holders in contact with one another to surfaces free of any contact of one holder with the corresponding surfaces of the other holders is about 85%.

* * * * *